US008014566B2

(12) United States Patent
Ogawa

(10) Patent No.: US 8,014,566 B2
(45) Date of Patent: Sep. 6, 2011

(54) IMAGE PROCESSING APPARATUS

(75) Inventor: Kaname Ogawa, Kanagawa (JP)

(73) Assignee: Sony Corporation (JP)

( * ) Notice: Subject to any disclaimer, the term of this patent is extended or adjusted under 35 U.S.C. 154(b) by 1211 days.

(21) Appl. No.: 11/546,081

(22) Filed: Oct. 11, 2006

(65) Prior Publication Data
US 2007/0127773 A1 Jun. 7, 2007

(30) Foreign Application Priority Data

Oct. 11, 2005 (JP) .................. P2005-296052

(51) Int. Cl.
G06K 9/00 (2006.01)
G06K 9/34 (2006.01)
G06K 9/46 (2006.01)

(52) U.S. Cl. ............... 382/103; 382/173; 382/236

(58) Field of Classification Search ............ 382/100, 382/103, 168, 171–173, 236; 348/169, 400, 348/421, 400.1, 421.1; 345/418
See application file for complete search history.

(56) References Cited

U.S. PATENT DOCUMENTS

| 6,195,497 | B1 | 2/2001 | Nagasaka et al. |
| 6,408,301 | B1 | 6/2002 | Patton et al. |
| 6,442,538 | B1 | 8/2002 | Nojima |
| 6,560,281 | B1 * | 5/2003 | Black et al. .............. 375/240 |
| 6,707,851 | B1 | 3/2004 | Choi et al. |
| 6,724,915 | B1 * | 4/2004 | Toklu et al. .............. 382/103 |
| 6,925,245 | B1 | 8/2005 | Miyatake et al. |
| 2003/0086496 | A1 * | 5/2003 | Zhang et al. ............. 375/240.16 |
| 2003/0123541 | A1 | 7/2003 | Jun et al. |
| 2006/0251292 | A1 * | 11/2006 | Gokturk et al. .......... 382/103 |
| 2008/0181453 | A1 * | 7/2008 | Xu et al. .................. 382/103 |

FOREIGN PATENT DOCUMENTS

| EP | 1024444 | A2 | 8/2000 |
| JP | 05-204990 | A | 8/1993 |
| JP | 6-223179 | A | 8/1994 |
| JP | 9-107517 | A | 4/1997 |
| JP | 2000-312310 | A | 11/2000 |
| JP | 2003-087772 | A | 3/2003 |
| JP | 2004-112678 | A | 4/2004 |

OTHER PUBLICATIONS

European Search Report, EP 06021090, dated Sep. 23, 2009.
Partial European Search Report, EP 06021090, dated Jun. 5, 2009.

(Continued)

*Primary Examiner* — Samir A Ahmed
*Assistant Examiner* — Mehdi Rashidian
(74) *Attorney, Agent, or Firm* — Lerner, David, Littenberg, Krumholz & Mentlik, LLP

(57) ABSTRACT

An image processing apparatus includes a moving image file storage unit operable to store a moving image file; an area selection receiving unit operable to receive a selection of a predetermined area corresponding to one of a plurality of frames forming the moving image file; a template image generating unit operable to generate as a template image an image of the selected area; an image matching unit operable to obtain the frames from the moving image file storage unit, and to match each of the frames against the template image to search for a matching frame containing an image similar to the template image; and a scene change detecting unit operable to detect a start and an end of a scene containing the matching frame.

13 Claims, 13 Drawing Sheets

OTHER PUBLICATIONS

Nagasaka A et al:Indexing and Full-Video Search for Object Appearances Visual Database Systems, II. Second Working Conference, Sep. 30-Oct. 3, 1991, Budapest, Elsevier Science Publishers, (Sep. 30, 1991), pp. 113-127.

Ueda H et al: "Automatic Structure Visualization Eor Video Editing" Proceedings of the Conference on Human Eactors in Computing Systems. (Interchi), Amsterdam. Apr. 24-29, 1993, Addison Wesley, US, vol. -, (Apr. 24, 1993), pp. 137-141.

Nakajima Y: "A Video Browsing Using East Scene Cut Detection Eor an Efeicient Networked Video Database Access" IEICE Transactions on Information and Systems, Information & Systems Society, Tokyo, UP, vol. E77-D, No. 12,1 (Dec. 1, 1994), pp. 1355-1364.

Sugano M et al: "A fast scene change detection on MPEG coding parameter domain" Proceedings 1998 International Conference on Image Processing, ICIP 98, Chicago, USA, Oct. 4-7, 1998, IEEE Comput. Soc., vol. 1, (Oct. 4, 1998), pp. 888-892.

Office Action from Taiwan Application No. 095136787, dated Dec. 11, 2009.

* cited by examiner

FIG. 8A
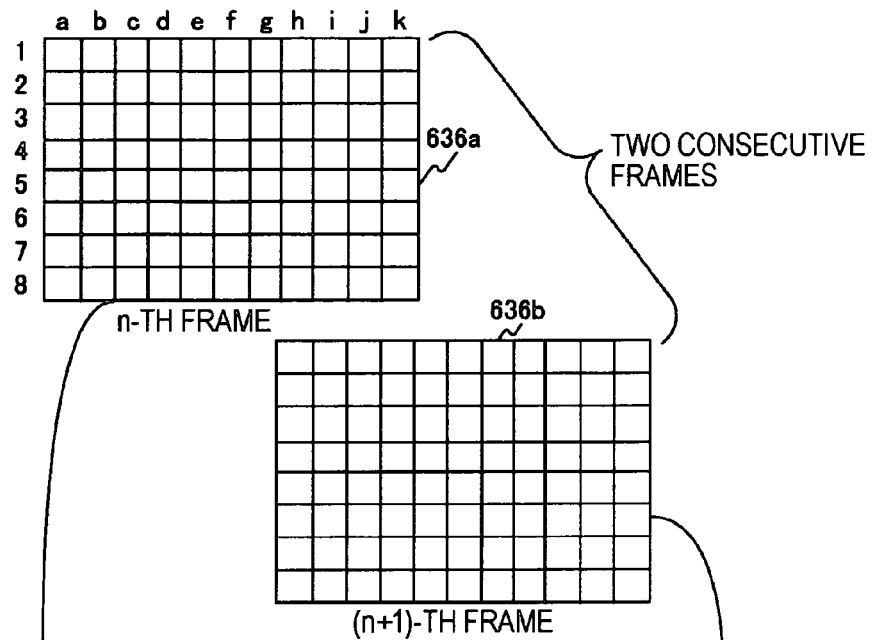
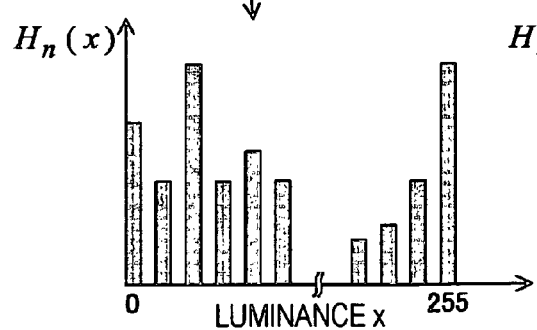
FIG. 8B
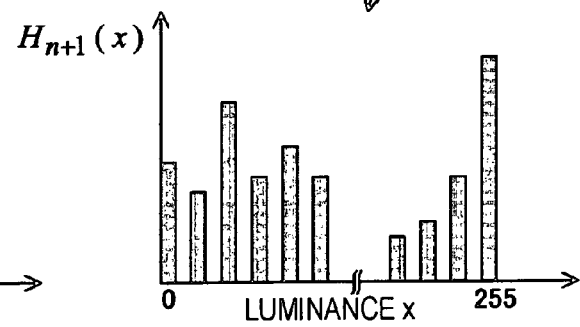
FIG. 8C

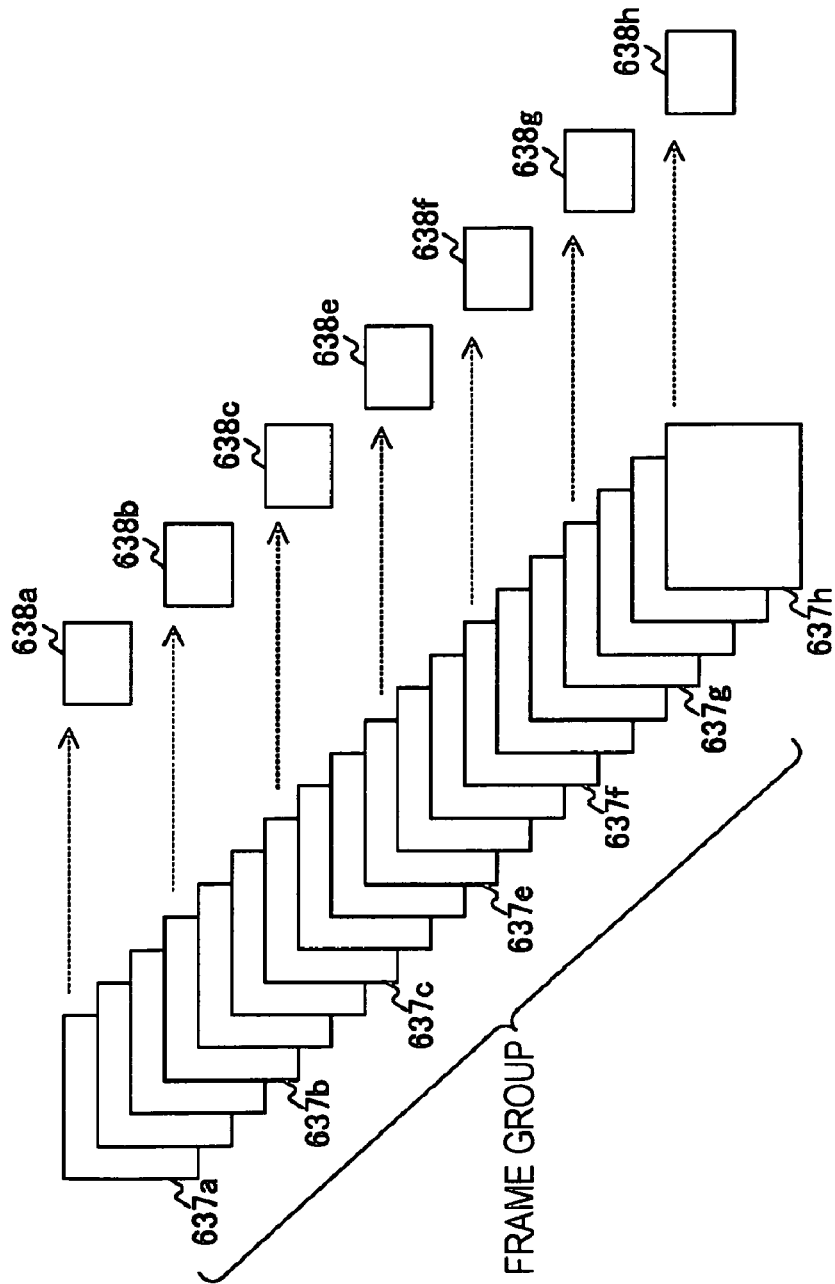

FIG. 10

| FILE NAME | NUMBER OF OVERALL FRAMES | SCENE #1 | | SCENE #2 | | ... |
|---|---|---|---|---|---|---|
| | | START FRAME NUMBER | END FRAME NUMBER | START FRAME NUMBER | END FRAME NUMBER | |
| FILE A | 32000 | 4896 | 15621 | 25147 | 26325 | ... |
| FILE B | 22000 | 11542 | 14523 | — | — | ... |
| FILE C | 28000 | 2821 | 3054 | 14263 | 26541 | ... |
| ... | ... | ... | ... | ... | ... | ... |

FIG. 12A
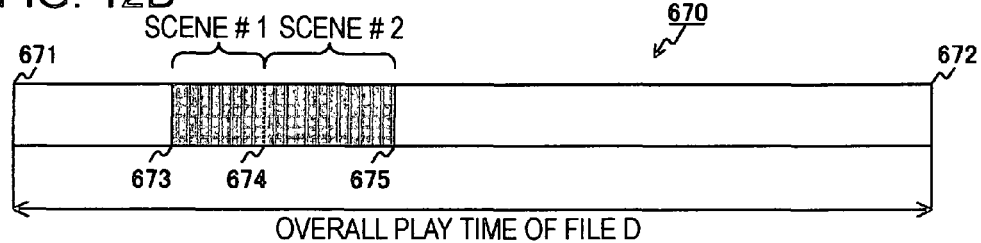
FIG. 12B
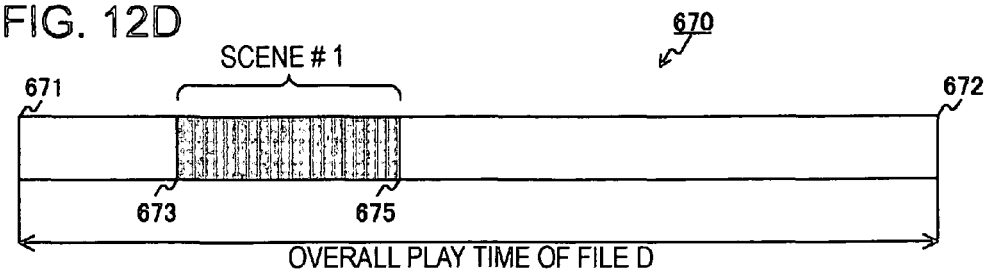
FIG. 12C
| FILE NAME | NUMBER OF OVERALL FRAMES | SCENE # 1 | | SCENE # 2 | | ... |
|---|---|---|---|---|---|---|
| | | START FRAME NUMBER | END FRAME NUMBER | START FRAME NUMBER | END FRAME NUMBER | ... |
| FILE D | 22000 | 5500 | 6200 | — | — | ... |
| ⋮ | ⋮ | ⋮ | ⋮ | ⋮ | ⋮ | ⋮ |
FIG. 12D

IMAGE PROCESSING APPARATUS

CROSS-REFERENCE TO RELATED APPLICATIONS

The present application claims priority from Japanese Patent Application No. JP 2005-296052 filed on Oct. 11, 2005, the disclosure of which is hereby incorporated by reference herein.

BACKGROUND OF THE INVENTION

1. Field of the Invention

The present invention relates to an image processing apparatus detecting a scene and, in particular, to an image processing apparatus, an image processing method, and a computer program for detecting a scene containing a selected object.

2. Description of the Related Art

As prices of memories are reduced and technology of the memory advances, the capacity of memories in image pickup apparatuses such as digital still cameras and digital video cameras increases. The number of moving images stored on the image pickup apparatuses also increases. Under this circumference, there is a need for techniques that allow users to view a predetermined scene of a desired moving image. Known techniques cannot detect a scene centered on a subject desired by the user from the moving image captured by the image pickup apparatus such as digital still cameras and digital video cameras.

Japanese Unexamined Patent Application Publication No. 5-204990 discloses a technique addressing this problem. In accordance with the disclosed technique, an area of a frame constructing a moving image is selected, the frame containing an image surrounded within the area is found, a period within which the found frames are continuous with each other is selected as one scene, and a keyword is imparted to the period to help a user search for the scene of the moving image. In accordance with this technique, a predetermined condition is set on space between partial periods where the found frames are consecutive, and when the predetermined condition is satisfied, the partial periods are linked to each other to form one scene. The predetermined condition for linking the partial periods is that the number of frames interposed between one partial period and another partial period is set to be a predetermined number or less. In another technique, an image of an object desired by the user is set to be a template image, the template image and a frame constructing the moving image are matched against each other so that a set of frames containing an image similar to the template image is handled as one scene.

In the technique disclosed in Japanese Unexamined Patent Application Publication No. 5-204990, periods having the consecutive found frames are selected as one scene. If one condition that the number of frames interposed between one partial period and another partial period is equal to or less than a predetermined number is satisfied, the periods are linked as one scene regardless of the content consistency of the scene. A definitely unrelated scene may be contained in one scene. In the other technique, the template image and the frame constructing the moving image are matched against each other and the set of frames containing images similar to the template image are handled as one scene. A frame in which a subject temporarily happens to look to a different direction in the moving image is not handled as a frame containing the images similar to the template image. The scene that should be otherwise within one group can be split.

It is thus desirable to provide an image processing apparatus for detecting accurately a scene where a targeted object appears in a moving image.

SUMMARY OF THE INVENTION

In accordance with one embodiment of the present invention, an image processing apparatus includes a moving image file storage unit operable to store a moving image file; an area selection receiving unit operable to receive a selection of a predetermined area corresponding to one of a plurality of frames forming the moving image file; a template image generating unit operable to generate as a template image an image of the selected area; an image matching unit operable to obtain the frames from the moving image file storage unit, and to match each of the frames against the template image to search for a matching frame containing an image similar to the template image; and a scene change detecting unit operable to detect a start and an end of a particular scene containing the matching frame. The image processing apparatus thus accurately detects in the moving image a scene in which an object of interest to a user appears.

The image matching unit may obtain from the moving image file storage unit one frame every predetermined number of frames out of the plurality of frames positioned in time sequence. The frame containing an object of interest to the user is searched at high speed.

The scene change detecting unit may include a frame acquisition unit for obtaining, from the moving image file storage unit, frames positioned in time sequence prior to and subsequent to the matching frame; a pixel value distribution generating unit for generating a distribution of pixel values for pixels forming the frames obtained by the frame acquisition unit; a distribution difference sum calculating unit for calculating a distribution difference sum that is the sum of differences in distributions of the pixel values between frames adjacent to each other in time sequence; a scene change determining unit for determining whether the distribution difference sum is above a predetermined threshold, and if the distribution difference sum is above the predetermined threshold, for determining that the scene has changed, and for determining that a frame corresponding to the distribution difference sum above the predetermined threshold is one of a start frame or an end frame of the scene. A visible element, such as the distribution of the pixel values for the pixels of the frames forming the moving image, is thus used to detect a scene in which an object of interest appears. The scene matching the feeling of the user can successfully be detected.

The frame acquisition unit may obtain, from the moving image file storage unit, one frame every predetermined number of frames out of the plurality of frames positioned in time sequence prior to and subsequent to the matching frame. One scene in which an object of interest to the user appears is detected fast in the moving image.

The pixel value distribution generating unit may use, as a pixel value, a quantity represented by YUV, and may generate a distribution of each component of YUV for each pixel forming the frames obtained by the frame acquisition unit. The distribution difference sum calculating unit may calculate, as the distribution difference sum, each of a Y component distribution difference sum, a U component distribution difference sum, and a V component distribution difference sum, by summing the differences in distributions of each component of the YUV between frames adjacent to each other in time sequence. The scene change determining unit may determine whether each of the Y component distribution difference sum, the U component distribution difference sum, and the V component distribution difference sum is above a predetermined threshold value thereof, and if one of the Y component distribution difference sum, the U component distribution difference sum, and the V component distribution difference sum is above the predetermined threshold value thereof, the scene change determining unit may determine that the scene has changed, and that a frame corresponding to the one of the Y component distribution difference sum, the U component distribution difference sum, and the V component distribution difference sum above the predetermined threshold value thereof is one of a start frame or an end frame of the scene. One scene containing an object of interest to the user is accurately detected using a visible element such as the distribution of YUV of each pixel of the frames forming the moving image.

The image processing apparatus may further include a frame reducing unit for reducing frames forming the moving image file. The moving image file storage unit stores the frames that have been reduced by the frame reducing unit. The area selection receiving unit receives the predetermined area corresponding to one of the reduced frames. The image matching unit matches each of the reduced frames against the template image to search for a matching reduced frame containing an image similar to the template image. Using the reduced frame, the scene change detecting unit detects a start and an end of a scene containing the matching reduced frame. Since the reduced frame is used to detect the scene, the amount of calculation involved is decreased. The detection of scenes is performed at high speed.

The frame reducing unit may reduce one frame every predetermined number of frames out of the plurality of frames positioned in time sequence. One scene containing an object of interest to the user is detected at high speed.

The image processing apparatus may further includes a moving image file information acquisition unit for obtaining, from the stored moving image file, moving image file information including information relating to a start and an end of a moving image corresponding to the moving image file; a scene information table for storing the moving image file information and information relating to the start and the end of the particular scene containing the matching frame, with each moving image file associated with moving image file information and information relating to the start and the end of a particular scene; and a scene time point display generating unit for generating a scene time point display indicating a time of the particular scene with respect to the overall play time of the moving image based on the information relating to the start and the end of the moving image corresponding to the moving image file, and the information relating to the start and the end of the particular scene. With this arrangement, the scene time point display indicating a time point of each scene in the overall play time of a single moving file is generated.

The moving image file information acquisition unit may obtain the number of frames contained in the moving image file as the information relating to the start and the end of the moving image corresponding to the moving image file. The scene information table may contain a start frame number and an end frame number of the particular scene as the information relating to the start and the end of the particular scene containing the matching frame. The scene time point display generating unit may generate the scene time point display based on the number of frames contained in the moving image file, and the start frame number and the end frame number of the particular scene. The scene time point display indicating a time point of each scene in the overall play time of a single moving file is generated based on the number of frames contained in the moving image file, and the start frame number and the end frame number of the scene.

The scene time point display generating unit may generate the scene time point display with one scene and the next scene subsequent to the one scene handled as a single scene if the end of the one scene is continued to the start of the next scene. Unnaturally split scenes are thus linked into a single scene.

In accordance with another embodiment of the present invention, an image processing apparatus includes an image pickup unit operable to generate a moving image file by picking up an image of a subject; a moving image file storage unit operable to store the moving image file; an area selection receiving unit operable to receive a selection of a predetermined area corresponding to one of a plurality of frames forming the moving image file; a template image generating unit operable to generate as a template image an image of the selected area; an image matching unit operable to obtain the frames from the moving image file storage unit, and to match each of the frames against the template image to search for a matching frame containing an image similar to the template image; a scene change detecting unit operable to detect a start and an end of a particular scene containing the matching frame; a moving image file information acquisition unit operable to obtain, from the stored moving image file, moving image file information including information relating to a start and an end of a moving image corresponding to the moving image file; a scene information table operable to store the moving image file information and information relating to the start and the end of the particular scene containing the matching frame with each moving image file associated with moving image file information and information relating to the start and the end of a particular scene; a scene time point display generating unit operable to generate a scene time point display indicating a time of the particular scene with respect to the overall play time of the moving image based on the information relating to the start and the end of the moving image corresponding to the moving image file, and the information relating to the start and the end of the particular scene; and a display unit operable to display the scene time point display. With this arrangement, one scene containing an object of interest to the user is accurately detected in the captured moving image and then displayed.

In accordance with another embodiment of the present invention, each of a processing method and a program for executing a processing method of an image processing apparatus including a moving image file storage unit storing a moving image file, includes receiving a selection of a predetermined area corresponding to one of a plurality of frames forming the moving image file; generating as a template image an image of the selected area; obtaining the frames from the moving image file storage unit, and matching each of the frames against the template image to search for a matching frame containing an image similar to the template image; and detecting a start and an end of a scene containing the matching frame.

In accordance with embodiments of the present invention, one scene containing an object of interest to the user is accurately detected in the moving image.

BRIEF DESCRIPTION OF THE DRAWINGS

FIGS. 8A-8C illustrate a distribution of pixel values of pixels constructing a frame in accordance with one embodiment of the present invention;

FIG. 9 illustrates mapping of a frame group of frames constructing a moving image file to reduced frames;

FIG. 10 illustrates the content of a scene information table in accordance with one embodiment of the present invention;

FIGS. 12A-12D illustrate a linkage of scenes in accordance with one embodiment of the present invention;

DETAILED DESCRIPTION

The embodiments of the present invention are described below with reference to the drawings. In the following discussion, an image pickup apparatus 100 is described as one example of an image processing apparatus.

FIGS. 1A-1D are external views of image pickup apparatuses 100a and 100b as examples of the image pickup apparatus 100. The image pickup apparatus 100a is intended to mainly pick up still images, and the image pickup apparatus 100b is intended to mainly pick up moving images.

Figure 1A:
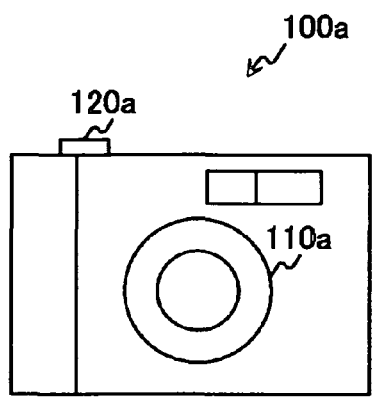
FIGS. 1A-1D illustrate image pickup apparatuses as examples of embodiments of the present invention.
Figure 1B:
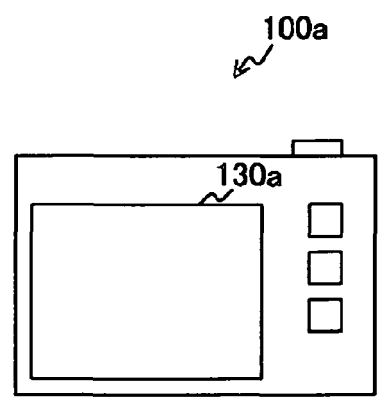

FIG. 1A is a front view of the image pickup apparatus 100a. The image pickup apparatus 100a picks up an image of a subject through a lens unit 110a. When a shutter 120a is pressed, the image pickup apparatus 100a generates a still image. FIG. 1B is a rear view of the image pickup apparatus 100a. The movement of the subject captured through the lens unit 110a is displayed on a display 130a. The generated still image is also displayed on the display 130a.

Figure 1C:
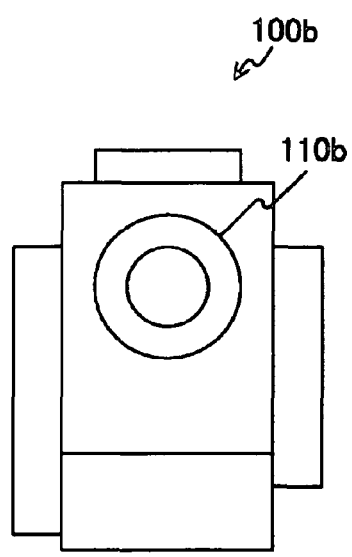
Figure 1D:
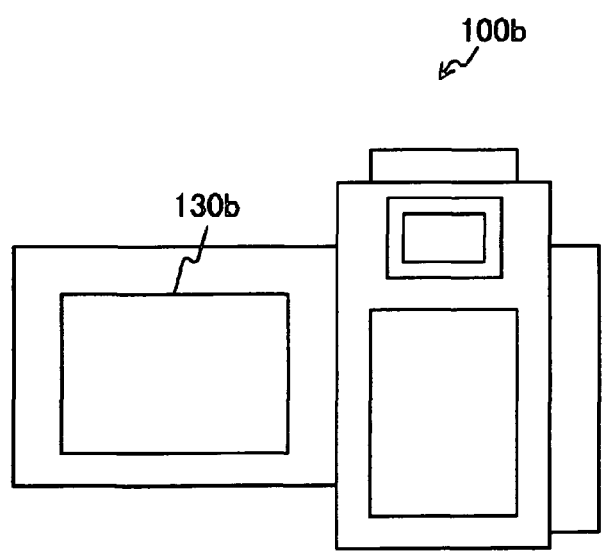

FIG. 1C is a front view of the image pickup apparatus 100b. The image pickup apparatus 100b picks up an image of a subject through a lens unit 110b. When a recording button (not shown) is pressed, the image pickup apparatus 100b generates a moving image. FIG. 1D is a rear view of the image pickup apparatus 100b. The movement of the subject captured through the lens unit 110b is displayed on a display 130b. The generated moving image is also displayed on the display 130b. The image pickup apparatus 100b has also a function of generating a still image. The generated still image is also displayed on the display 130b.

In accordance with one embodiment of the present invention, a template image is generated based on any of frames constructing a moving image file generated by one of the image pickup apparatus 100a and the image pickup apparatus 100b. A frame containing an image similar to the generated template image (hereinafter referred to as a similar template image containing frame) is searched for. A start time and an end time of one scene of a moving image containing the similar template image containing frame are detected from the moving image file. The detected result is output as a display indicating a time point of the scene with respect to the overall play time of the moving image file (hereinafter referred to as a scene time point display).

Figure 2:
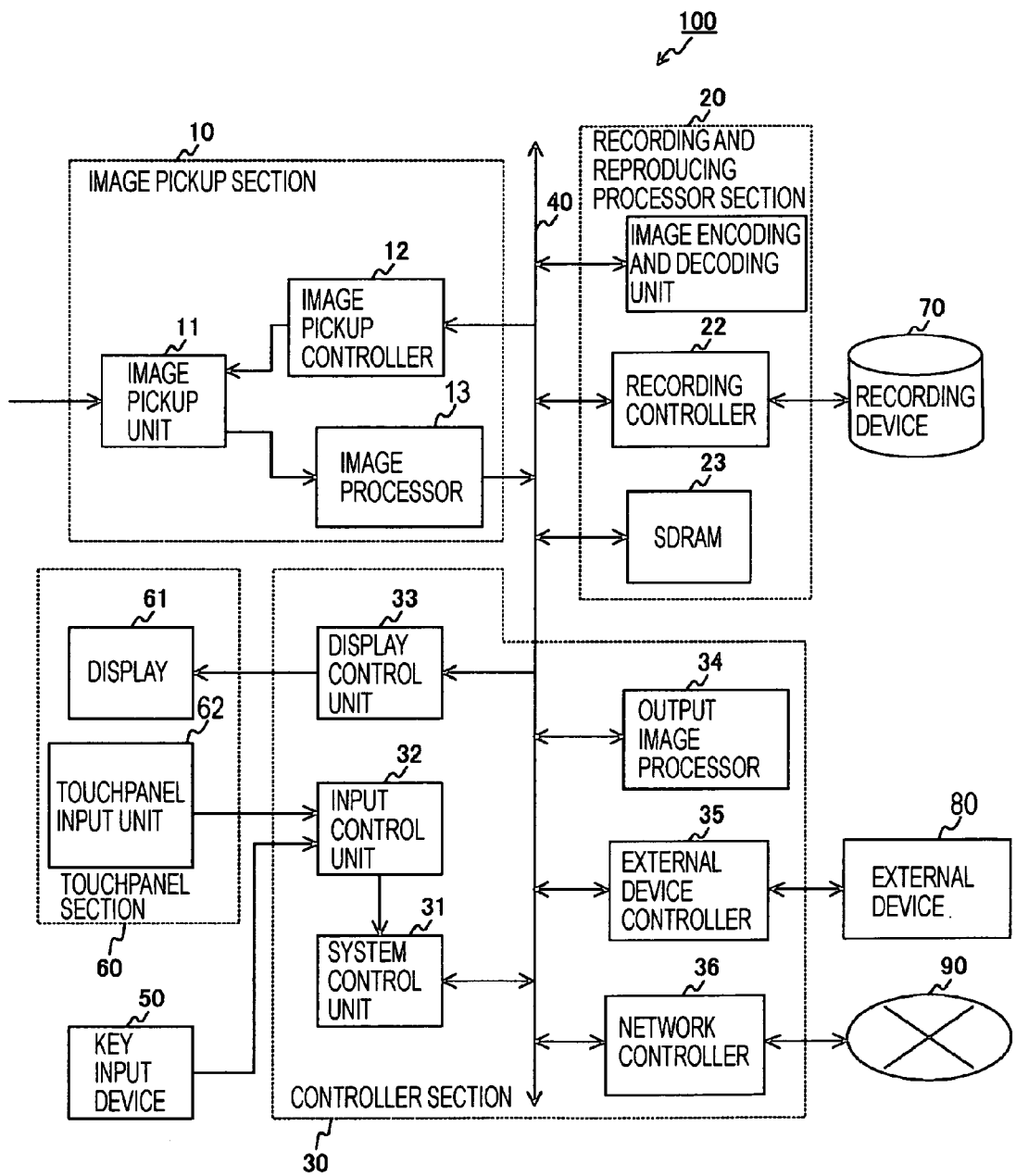
FIG. 2 is a block diagram of the image pickup apparatus in accordance with one embodiment of the present invention.

FIG. 2 illustrates the image pickup apparatus 100 in accordance with one embodiment of the present invention. The image pickup apparatus 100 of the embodiment of the present invention includes an image pickup section 10, a recording and reproducing processor section 20, a controller section 30, a bus 40, a key input device 50, a touchpanel section 60, and a recording device 70.

The image pickup section 10 includes an image pickup unit 11, an image pickup controller 12, and an image processor 13. The image pickup unit 11 includes a lens unit for picking up an image of a subject (corresponding to one of the lens unit 110a and the lens unit 1ob of FIG. 1), an aperture diaphragm mechanism, a focus adjustment mechanism, and an image pickup element such as a charge coupled device (CCD), and focuses light entering through the lens unit to form the image on a focusing surface of the image pickup element. Upon receiving an image capturing timing signal supplied through the bus 40 from the controller section 30 in response to a shutter operation, the image pickup unit 11 converts the subject image focused on the focusing surface of the image pickup element into an image pickup signal, and supplies the image pickup signal to the image processor 13.

Upon receiving a control signal supplied through the bus 40 from the controller section 30, the image pickup controller 12 generates a control signal to be supplied to the image pickup unit 11. The image pickup controller 12 supplies the generated control signal to the image pickup unit 11, thereby performing zoom control, shutter control, and exposure control processes.

Upon receiving a control signal through the bus 40 from the controller section 30, the image processor 13 performs gamma correction and automatic gain control (AGC) processes while converting the image pickup signal into a digital video signal.

The recording and reproducing processor section 20 includes an image encoding and decoding unit 21, a recording controller 22, and a synchronous dynamic random access memory (SDRAM) 23. The image encoding and decoding unit 21 encodes and multiplexes the video signal supplied through the bus 40 from the image pickup section 10, thereby converting the video signal into compressed data. The image encoding and decoding unit 21 also decodes compressed data into a video signal.

Upon receiving compressed data from the image encoding and decoding unit 21, the recording controller 22 writes the received compressed data onto the recording device 70. The recording controller 22 reads compressed data from the recording device 70 and supplies the read data to the image encoding and decoding unit 21. The recording device 70 may be external or internal to the image pickup apparatus 100. The recording device 70 includes but is not limited to one of a memory card, into which a flash memory is packaged, a magnetic disk such as a hard disk, an optical disk such as DVD, and a magneto-optical (MO) disk. The SDRAM 23 serves as a working area for encoding and decoding processes of the image encoding and decoding unit 21.

The controller section 30 includes a system control unit 31, an input control unit 32, a display control unit 33, an output image processor 34, an external device controller 35, and a network controller 36.

The system control unit 31 generally controls the controller section 30. The key input device 50 connected to the input control unit 32 includes a plurality of keys such as a mode switching key switching between an image pickup mode and another mode such as a playback mode, a zoom adjustment key, an exposure adjustment key, a shutter key (corresponding to the shutter 120a of FIG. 1), and a moving image capturing key. A touchpanel input unit 62 connected to the input control unit 32 receives menu selection and designation of a predetermined area of image data displayed on a display 61.

The input control unit 32 relays an operation signal from the key input device 50 and the touchpanel input unit 62 to the system control unit 31. The system control unit 31 determines whether any key is operated on the key input device 50 and the touchpanel input unit 62 and performs control process in response to the determination results.

The display 61 connected to the display control unit 33 may include a liquid-crystal display (LCD), and under the control of the system control unit 31, displays a video signal supplied from the image pickup section 10 and the video signal read from the recording device 70 via the bus 40. The display 61 corresponds to each of the display 130a and the display 130b of FIG. 1.

The output image processor 34 performs a predetermined modification process on the video data during playback of the video data. The modification process includes color correction on the video data. The process, performed on the video data by the output image processor 34, could be performed by the system control unit 31.

An external device 80 connected to the external device controller 35 includes but is not limited to a personal computer. The external device 80 may be connected to the external device controller 35 using a universal serial bus (USB) cable. Connection means between the external device 80 and the external device controller 35 is not limited to the USB cable. The external device controller 35 controls data exchange between the image pickup apparatus 100 and the external device 80.

The network controller 36 controls data exchange performed between the image pickup apparatus 100 and a network 90. The network 90 includes but is not limited to one of the Internet and a local area network (LAN).

Figure 3:
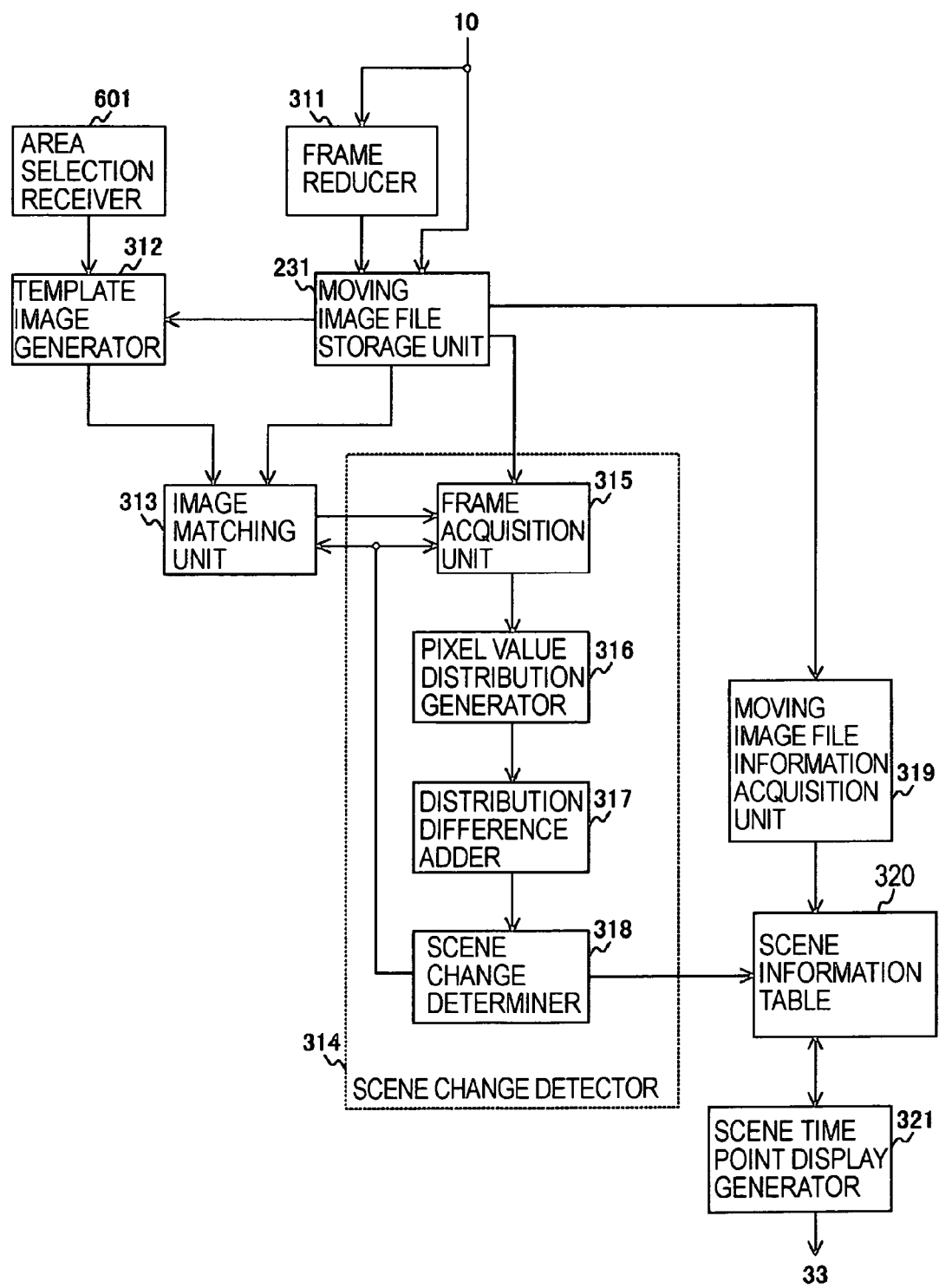
FIG. 3 is a functional block diagram of a scene detection function in accordance with one embodiment of the present invention.

FIG. 3 illustrates a scene detection function in accordance with one embodiment of the present invention. The scene detection function includes a moving image file storage unit 231 storing a moving image file, a frame reducer 311, an area selection receiver 601, a template image generator 312, an image matching unit 313, a scene change detector 314, a moving image information acquisition unit 319, a scene information table 320, and a scene time point display generator 321.

The frame reducer 311 reduces a frame constructing the moving image file stored on the moving image file storage unit 231 at a predetermined reduction ratio. The frame reducer 311 may reduces all constructing frames constructing the moving image file or one every predetermined number of frames out of the frames positioned in time sequence. The reduced frame is stored on the moving image file storage unit 231.

The area selection receiver 601 receives selection of any one of the constructing frames constructing the moving image file stored on the moving image file storage unit 231 and selection of an area to be extracted as a template image in the selected frame. The frame to be received by the area selection receiver 601 may be a frame reduced by the frame reducer 311.

The template image generator 312 generates the template image by extracting an area to be extracted from the frame as a template image in response to the selection of the area received by the area selection receiver 601. If the frame with the selection thereof received by the area selection receiver 601 is the frame reduced by the frame reducer 311, the template image generator 312 extracts, from the reduced frame, the area to be extracted as the template image.

The template image generator 312 expands and reduces, at a predetermined magnification ratio, the template image generated as a result of extraction. The expanded and reduced images can also be used as template images. The template image generator 312 can rotate the template image as a result of extraction, the expanded image, and the reduced image by a predetermined angle. Each of the images rotated by the predetermined angle can also serve as a template image.

The image matching unit 313 obtains a frame from the moving image file storage unit 231, and matches the obtained frame against the template image to search for a similar template image containing frame. Upon hitting the similar template image containing frame, the image matching unit 313 so notifies the frame acquisition unit 315, and suspends the searching of the similar template image containing frame.

When the template image is the one generated based on the frame reduced by the frame reducer 311, the frame the image matching unit 313 has obtained from the moving image file storage unit 231 is the one reduced by the frame reducer 311. An amount of calculation involved in the matching of the frame against the template image is reduced by matching the frame reduced by the frame reducer 311 against the template image. High-speed searching is thus performed.

After the image matching unit 313 matches the frame reduced by the frame reducer 311 against the template image to search for a candidate for the similar template image containing frame, the template image may be further matched against an unreduced frame. In this way, whether to adopt the candidates as the similar template image containing frame may be determined.

The scene change detector 314 detects a start and an end of a scene containing the similar template image containing frame hit by the image matching unit 313. The scene change detector 314 includes a frame acquisition unit 315, a pixel value distribution generator 316, a distribution difference adder 317, and a scene change determiner 318.

The frame acquisition unit 315 obtains from the moving image file storage unit 231 the frames positioned in time sequence prior to and subsequent to the similar template image containing frame hit by the image matching unit 313. More specifically, the frame acquisition unit 315 obtains a past frame in time prior to the similar template image containing frame hit by the image matching unit 313 (hereinafter referred to as a backward scene frame) and a future frame in time subsequent to the similar template image containing frame hit by the image matching unit 313 (hereinafter referred to as a forward scene frame). The frame acquisition unit 315 may obtain any of the forward scene frame and the backward scene frame first.

Upon hitting the similar template image containing frame, the image matching unit 313 notifies so the frame acquisition unit 315. In response to the notification from the image matching unit 313, the frame acquisition unit 315 starts obtaining one of the forward scene frame and the backward scene frame.

When the frame acquisition unit 315 obtains the forward scene frame first, the scene change determiner 318 determines that the scene has changed. The scene change determiner 318 then notifies the frame acquisition unit 315 that the scene has changed. In response to the notification from the scene change determiner 318, the frame acquisition unit 315 stops obtaining the forward scene frame and starts obtaining the backward scene frame. After the frame acquisition unit 315 starts obtaining the backward scene frame, the scene change determiner 318 may determine that the scene has changed. The scene change determiner 318 so notifies the frame acquisition unit 315. In response to the notification, the frame acquisition unit 315 stops obtaining the backward scene frame.

The frame obtained by the frame acquisition unit 315 may be a frame not reduced by the frame reducer 311 or may be a frame reduced by the frame reducer 311. As previously discussed, one frame every predetermined number of frames out of the frames positioned in time sequence may be reduced. In this case, the frame acquisition unit 315 obtains one reduced frame every predetermined number of frames out of the frames positioned in time sequence.

The pixel value distribution generator 316 generates a distribution of pixel values of the pixels constructing the frame obtained by the frame acquisition unit 315. The pixel value herein refers to luminance [0] or color difference of each pixel, and is YUV, for example. If eight bits are assigned, the Y component (luminance) as the pixel value has a value within a range from 0 to 255. The pixel value distribution generator 316 generates the distribution of the Y component (luminance) of each pixel for each frame obtained by the frame acquisition unit 315. In the above example, the pixel value is the Y component (luminance). Distribution is equally generated if the pixel value is a U component (difference between a luminance signal and a blue component) or a V component (difference between the luminance signal and a red component).

The distribution difference adder 317 calculates the distribution difference sum that is the sum of the differences of the distributions of the pixels between frames adjacent to each other in time sequence. For example, the Y component (luminance) is now considered as the pixel value. The distribution difference adder 317 calculates the difference in the distributions of the pixels having zero as the Y component (luminance) between the frames adjacent to each other in time sequence. The image matching unit 313 calculates difference for an entire range of Y components (luminance), and sums all differences as a distribution difference sum. The distribution difference adder 317 performs this calculation on all frames generated by the pixel value distribution generator 316. In the above example, the pixel value is the Y component (luminance). The same method is applicable when the pixel value is the U component (difference between the luminance signal and the blue component) or the V component (difference between the luminance signal and the red component).

The scene change determiner 318 determines whether the distribution difference sum is above a predetermined value. If the scene change determiner 318 determines that the distribution difference sum is above the predetermined value, it is determined that the scene has changed in a frame adjacent to another frame in time sequence corresponding to the distribution difference sum. Information relating to that frame is written onto the scene information table 320. The information relating to the frame written on the scene information table 320 includes a frame number of that frame, for example.

If the distribution difference sum is calculated for each of the Y component (luminance), the U component (difference between the luminance signal and the blue component) and the V component (difference between the luminance signal and the red component), there exist the distribution difference sum for the Y component (luminance), the distribution difference sum for the U component (difference between the luminance signal and the blue component) and the distribution difference sum for the V component (difference between the luminance signal and the red component). In this case, a predetermined threshold value is set for the distribution difference sum for each of the components. If any of the distribution difference sum for the Y component (luminance), the distribution difference sum for the U component (difference between the luminance signal and the blue component) and the distribution difference sum for the V component (difference between the luminance signal and the red component) is above the threshold thereof, it is determined that the scene has changed in the frames adjacent to each other in time sequence corresponding to the distribution difference sum. The scene detection is performed accounting for not only the Y component (luminance) but also the U component (difference between the luminance signal and the blue component) and the V component (difference between the luminance signal and the red component). Scene detection accuracy is thus increased.

Upon determining that the scene has changed, the scene change determiner 318 so notifies the frame acquisition unit 315 and the image matching unit 313. The scene change determiner 318 determines two changes in the scene, namely, a scene start and a scene end for one scene. For one scene, the scene change determiner 318 notifies twice the frame acquisition unit 315 and the image matching unit 313 of the scene change.

If the frame acquisition unit 315 is set to obtain the backward scene frame first, a first notification indicates the detection of the scene start. In response to the notification, the frame acquisition unit 315 stops obtaining the backward scene frame, and starts obtaining the forward scene frame. A second notification indicates the detection of the scene end. In response to the notification, the frame acquisition unit 315 stops obtaining the forward scene frame.

The image matching unit 313 takes no particular action in response to the first notification from the scene change determiner 318. However, in response to the second notification, the image matching unit 313 resumes the once suspended search of the similar template image containing frame. The frame the image matching unit 313 starts matching is a frame subsequent to the frame of the scene end.

The moving image information acquisition unit 319 obtains, from the moving image file stored on the moving image file storage unit 231, moving image file information containing information relating to a start and an end of a moving image corresponding to the moving image file. The moving image information acquisition unit 319 writes the obtained moving image file information onto the scene information table 320. The information relating to the start and the end of the moving image corresponding to the moving image file includes but is not limited to a start frame number and an end frame number of the moving image file and the total number of frames constructing the moving image corresponding to the moving image file.

The scene information table 320 stores the moving image file information obtained by the moving image information acquisition unit 319 and the information relating to the start and the end of the scene detected by the scene change detector 314 with each moving image file in association therewith. The information relating to the start and the end of the scene detected by the scene change detector 314 includes but is not limited to a start frame number and an end frame number of the scene.

Based on the information relating to the start and the end of the moving image corresponding to the moving image file and the information relating to the start and the end of the scene stored on the scene information table 320, the scene time point display generator 321 generates a scene time point display indicating a time point of the scene with respect to the overall play time of the moving image.

When a plurality of scenes are detected in the moving image corresponding to the moving image file, and when an end frame of one scene is adjacent in time sequence to a start frame of another scene, the scene time point display generator 321 links the two scenes, thereby making a scene time point display as one scene.

Figure 4A:
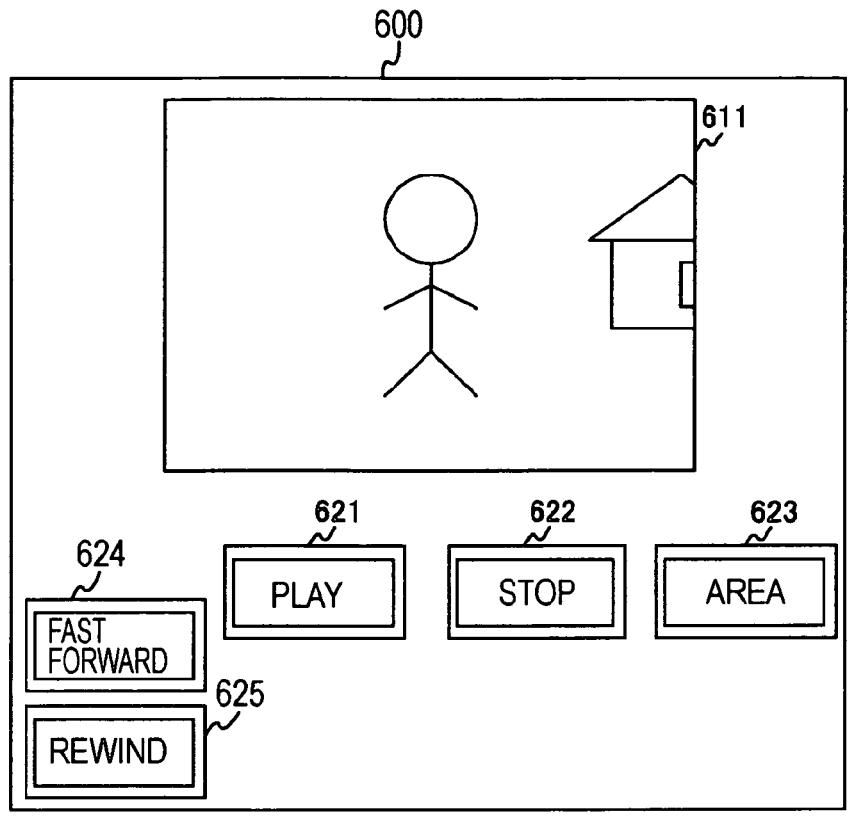
FIGS. 4A and 4B illustrate a area selected in a template image in accordance with one embodiment of the present invention.
Figure 4B:
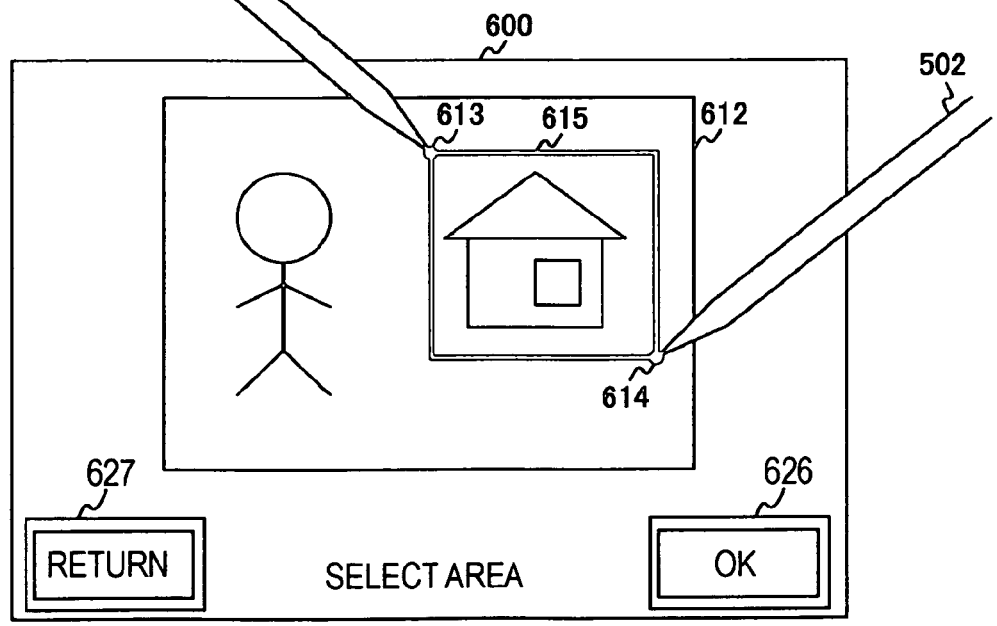

FIGS. 4A and 4B illustrate the selection of the area of the template image in accordance with one embodiment of the present invention. FIG. 4A illustrates playing of a moving image file. When a play button 621 is selected, the moving image file is played on a moving image display 611. When a stop button 622 is selected, the playing of the moving image file stops. For fast forward operation, a fast-forward button 624 is selected. For rewinding operation, a rewind button 625 is selected.

When a frame containing a desired image is found during playing of the moving image file, the stop button 622 is selected. The frame that was displayed at the selection of the stop button 622 is displayed on the moving image display 611. To display another desired frame, one of the play button 621, the fast-forward button 624, and the rewind button 625 is selected.

When an area button 623 is selected with the frame containing the desired frame displayed on the moving image display 611, an area selection image display 612 of FIG. 4B is shown on a display screen 600. In accordance with one embodiment of the present invention, a touchpanel mechanism that enters an operation input by directly pressing a display screen is used here. But the present invention is not limited to the touchpanel mechanism.

FIG. 4B illustrates the area of the frame selected subsequent to the operation discussed with reference to FIG. 4A. To select the area on the area selection image display 612, a point 613 is selected with a stylus 501 followed by the selection of a point 614 with a stylus 502. When the point 614 is selected with the stylus 502, an area 615 having a diagonal line connecting the point 613 and the point 614 is displayed. An image contained in the area 615 becomes a template image.

If an OK button 626 is selected with the area 615 displayed, the template image is generated. To select another area after the area 615 is displayed, a return button 627 is selected and an operation similar to the described above is performed on the frame in the area selection image display 612 to select the other area.

Figure 5A:
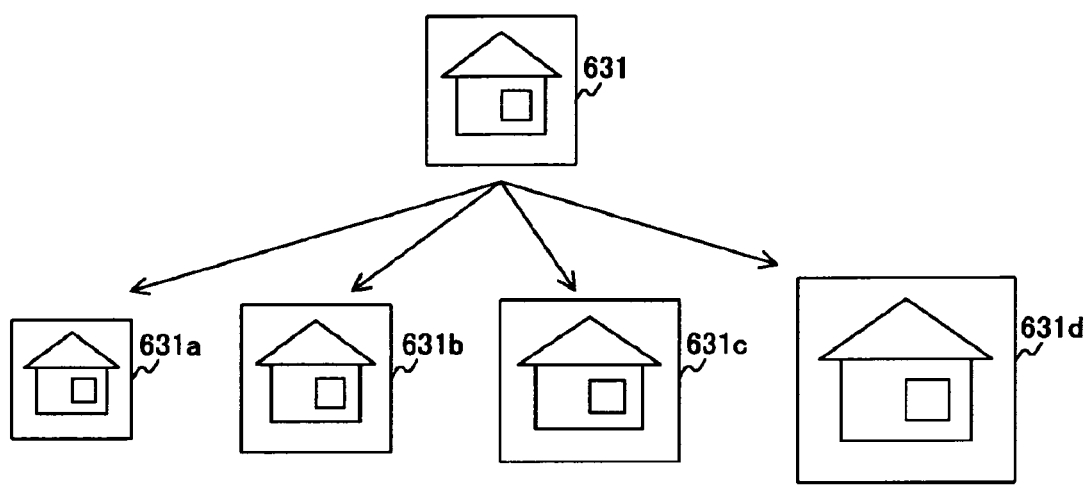
FIGS. 5A and 5B illustrates generated template images in accordance with one embodiment of the present invention.
Figure 5B:
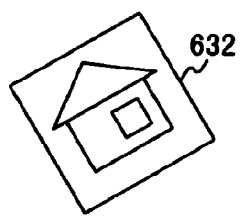

FIGS. 5A and 5B illustrate template image data generated in accordance with one embodiment of the present invention. When the area in the template image is selected, the template image generator 312 extracts the selected area of the target image. As shown in FIG. 5A, a template image 631 is generated.

The template image generator 321 generates template images 631a through 631d by expanding or reducing the template image 615. The template images 631a through 631d are respectively generated by expanding the template image 631 by 1.21, 1.1, 1.0, 0.909, and 0.826 times. As shown in FIG. 5A, the number of pieces of template image data other than the template image 615 is four. The present invention is not limited to four template images, and any number of template images may be used.

Number sequences 1.21, 1.1, 1.0, 0.909, and 0.826 are respectively considered as $(1.1)^2$, $(1.1)^1$, $(1.1)^0$, $(1.1)^{-1}$, and $(1.1)^{-2}$, namely, geometric sequences having the common ratio of 1.1. The use of a large common ratio increases the possibility of search miss when image search is performed using the template image. The use of a small common ratio increases an amount of calculation when image search is performed using the template image. The common ratio is preferably but not limited to 1.1 or so. A common ratio of 1.09 or 1.2 is also acceptable.

Not only the images obtained by expanding or reducing the template image 615 but also a template image 632 obtained by rotating the template image 631 as shown in FIG. 5B may be used as the template image.

Figure 6:
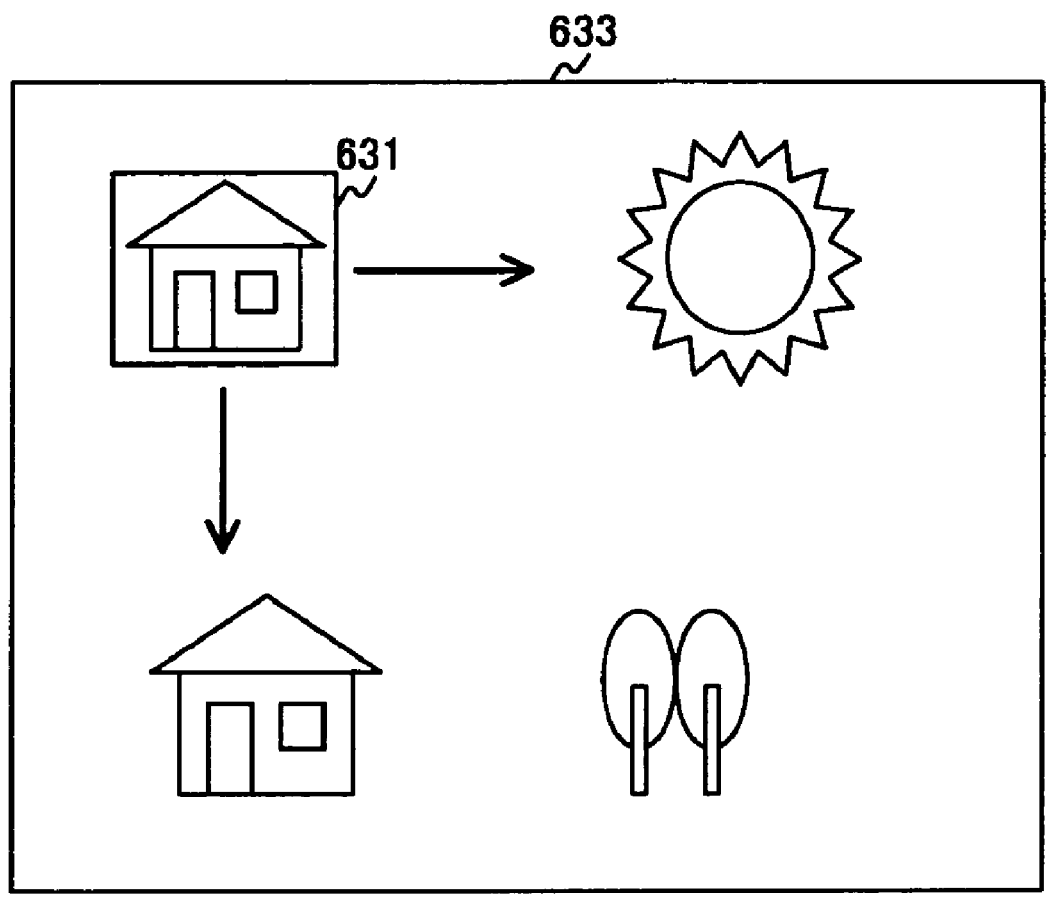
FIG. 6 illustrates a frame matched against a template image.

FIG. 6 illustrates a frame 633 matched against the template image 631. To search for a portion of the frame 633 similar to the template image 631, the template image 631 is matched against the frame 633. If the frame 633 contains a portion matching or similar to the template image 631, the frame 633 is determined as the similar template image containing frame discussed with reference to FIG. 1.

When the template image 631 is matched against the frame 633, a matching process starts with the top left corner of the frame 633. For example, the template image 631 is matched against the frame 633 with the template image 631 shifted at steps of a predetermined number of pixels (for example, one pixel) in the rightward direction indicated by one arrow mark in FIG. 6. Evaluation of whether the frame 633 contains the image similar to the template image 631 is performed using cross-correlation function. If a value calculated using the cross-correlation function is above a predetermined threshold, it is determined that the frame 633 contains the image similar to the template image 631.

When the matching process is performed with the template image 631 shifted at steps of the predetermined number of pixels and reaches the right end of the frame 633, the template image 631 is shifted by a predetermined number of pixels (for example, one pixel) in the downward direction indicated by the other arrow mark and then the matching process resumes again. When the portion of the frame 633 similar to the template image 631 is searched for in the matching process, the template images 631a-631d expanded from and reduced from the template image 631 and the template image 632 rotated by a predetermined angle from the template image 631, as discussed with reference to FIGS. 5A and 5B, are also matched against the frame 633.

The portion of the frame 633 similar to the template image 631 may be searched for on the entire frame 633. Alternatively, the portion of the frame 633 similar to the template image 631 may be searched form using a genetic algorithm (GA).

Figure 7A:
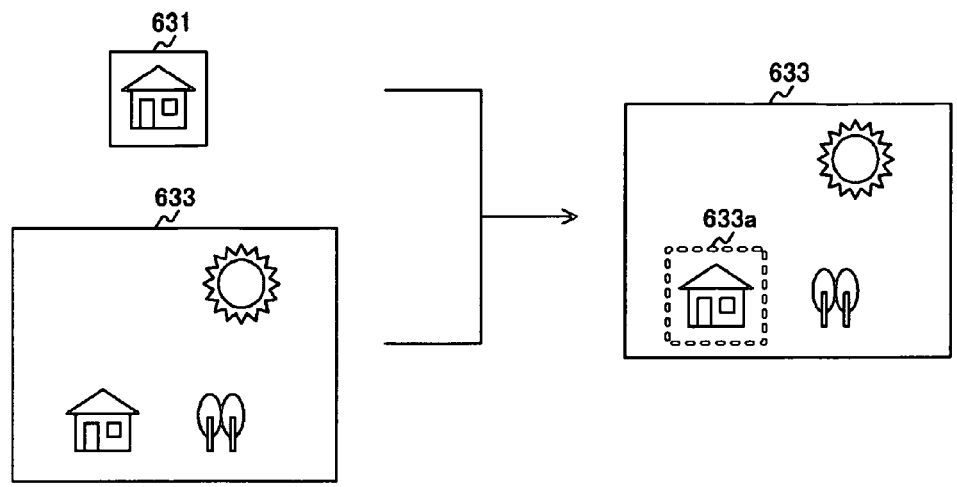
FIGS. 7A and 7B illustrate how a scene is detected in accordance with one embodiment of the present invention.
Figure 7B:
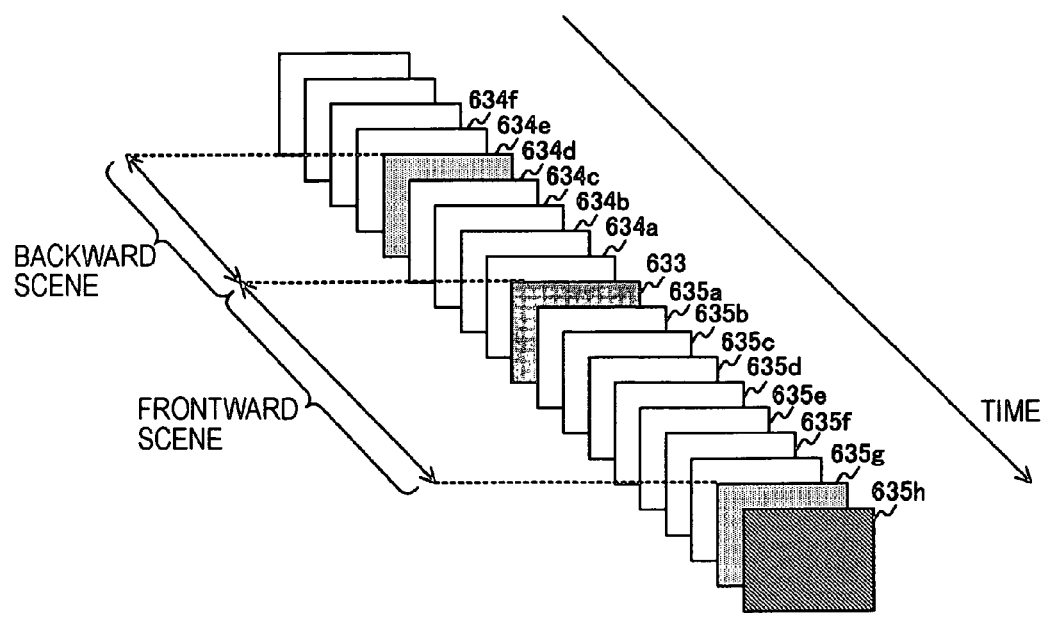

FIGS. 7A and 7B illustrate a scene detection process in accordance with one embodiment of the present invention. In accordance with the embodiment of the present invention, the scene detection process starts with matching a template image generated in response to the selection of a user against a frame constructing a moving image file. As a result, if the image similar to the template image 631 is found in an area 633a of the frame 633 as shown in FIG. 7A, the frame 633 is determined as a similar template image containing frame.

FIG. 7B illustrates the similar template image containing frame in the scene detection process. When the frame 633 as a similar template image containing frame corresponding to the template image 631 is hit as shown in FIG. 7A, frames arranged prior to and subsequent to the frame 633 are analyzed to detect a frame containing a scene change.

The frame acquisition unit 315 obtains a backward (past) scene frame 634a prior to the frame 633 in time, and the pixel value distribution generator 316 generates a distribution of pixel values of pixels constructing the backward scene frame 634a. The frame acquisition unit 315 further obtains a backward scene frame 634b, and the pixel value distribution generator 316 similarly generates a distribution of pixels values of pixels constructing the backward scene frame 634b.

The distribution difference adder 317 calculates a distribution difference sum that is the sum of differences between the distribution of the pixel values of the pixels constructing the backward scene frame 634a and the distribution of the pixel values of the pixels constructing the backward scene frame 634b. The scene change determiner 318 determines whether the distribution difference sum is above a predetermined threshold value.

The above process is successively performed on the backward scene frames 634c to 634f. If the scene change determiner 318 determines that the distribution difference sum between the backward scene frame 634e and the backward scene frame 634f, the backward scene frame 634e is determined as a start frame of scene.

When the start frame of scene is detected, an end frame of the scene is to be detected. The frame acquisition unit 315 obtains a frontward (future) scene frame 635a through a frontward (future) scene frame 635h located subsequent to the frame 633 in time sequence. The same process as discussed with reference to the backward scene frame 634a through the backward scene frame 634f is performed on the frontward scene frame 635a through the frontward scene frame 635h.

If the scene change determiner 318 determines that the distribution difference sum between the frontward scene frame 635g and the frontward scene frame 635h is above a predetermined threshold value, the frontward scene frame 635g is determined as an end frame of the scene.

In this way, one scene is generated including the backward scene frames composed of the backward scene frames 634e to the frame 633 and the frontward scene frames from the frame 633 to the frontward scene frame 635g.

When one scene is detected, the matching process of matching the template image against the frame starts to search for a next scene. The starting frame to be matched against the template image is a next frame subsequent to the final frame of the scene. As shown in FIG. 7B, the final frame of the scene is the frontward scene frame 635g, and the starting frame to be matched against the template image 631 is the frontward scene frame 635h.

FIGS. 8A-8C illustrate the generation process of the distribution of the pixel values of the pixels constructing each frame in accordance with one embodiment of the present invention. FIG. 8A illustrates an n-th frame 636a and an (n+1)-th frame 636b consecutively located in time sequence.

When the frame acquisition unit 315 obtains the frame 636a, the pixel value distribution generator 316 generates the distribution of the pixel values of the pixels constructing the frame 636a. FIG. 8B illustrates an example of the distribution of luminance of each pixel when the pixel value is luminance. One generation method of the distribution of luminance of each pixel shown in FIG. 8B is described below. The luminance of each of pixels a1 to k8 in the frame 636a of FIG. 8A is analyzed. The luminance of each of the pixels a1 through k8 is analyzed to determine the number of pixels on a per luminance level basis. More specifically, the number of pixels having zero luminance through the number of pixels having a luminance of 255 is determined. FIG. 8B shows a plot of the distribution of luminance of each pixel where the abscissa represents luminance x and the ordinate represents the number of pixels $H_n(x)$ responsive to the luminance x.

Similarly, when the frame acquisition unit 315 obtains the frame 636b, the pixel value distribution generator 316 generates the distribution of the pixel values of the pixels constructing the frame 636b. FIG. 8C illustrates the distribution of luminance of each pixel when the pixel value is luminance. Like FIG. 8B, FIG. 8C illustrates the distribution of the luminance of each pixel where the abscissa represents luminance x and the ordinate represents the number of pixels $H_{n+1}(x)$ responsive to the luminance x.

The distribution difference adder 317 calculates a distribution difference sum FHD relating to luminance in accordance with the following equation (1). Equation (1) sums the absolute value of the difference of all pixel values between the number of pixels Hn(x) corresponding to luminance x in one frame and the number of pixels Hn+1(x) corresponding to luminance x in the frame next to the one frame:

$$FHD = \sum_x |H_{n+1}(x) - H_n(x)| \qquad \text{Equation (1)}$$

When the distribution difference sum FHD of luminance is above a predetermined threshold value, it is determined that the scene change has took place in the frame corresponding to the distribution difference sum FHD. One of the start and the stop of the scene is now detected.

As shown in FIGS. 8A and 8B, the pixel value is luminance. When the pixel value is color difference, the distribution difference sum FHD of color difference is calculated generating the distribution of color difference of each pixel. When the distribution difference sum FHD of luminance and the distribution difference sum FHD of color difference are calculated, different threshold values may be set for the distribution difference sums FHD of luminance and color difference. Scene change is thus detected taking into consideration each of luminance and color difference.

FIG. 9 illustrates a group of frames constructing a moving image file and reduced frames. The frames reduced by the frame reducer 311 may be all constructing frames constructing the moving image file as previously discussed with reference to FIG. 3 or may be some of the constructing frames constructing the moving image file as discussed with reference to FIG. 9.

For example, the frame reducer 311 reduces frames 637a through 637h, each being one every three frames, thereby generating reduced frames 638a through 638h. The moving image file storage unit 231 stores the frame group and the reduced frames 638a through 638h.

As previously discussed, when image matching and calculation of the distribution difference sum are performed using the reduced frames, the number of pixels is reduced. The amount of calculation in the image matching unit 313, the pixel value distribution generator 316 and the distribution difference adder 317 is also reduced. High-speed scene detection is thus performed.

FIG. 10 illustrates a scene information table 320 in accordance with one embodiment of the present invention. The scene information table 320 contains a file name 3201 indicating a file name of a moving image file, the number of overall frames 3202, and scene information 3210.

The number of overall frames 3202 indicates the number of overall frames constructing a moving image corresponding to the moving image file. The number of overall frames 3202 is information representing play time of the moving image file. Instead of the number of overall frames 3202, a start frame number and an end frame number of a moving image corresponding to the moving image file may be stored as the information indicating the play time of the moving image file onto the scene information table 320.

The scene information 3210 is related to a start and an end of a scene contained in the moving image constructing the moving image file. The start frame number and the end frame number of the scene may be stored as the information related to the start and the end of the scene contained in the moving image constructing the moving image file. The scene information 3210 contains information units of the number equal to the number of scenes.

Figure 11A:
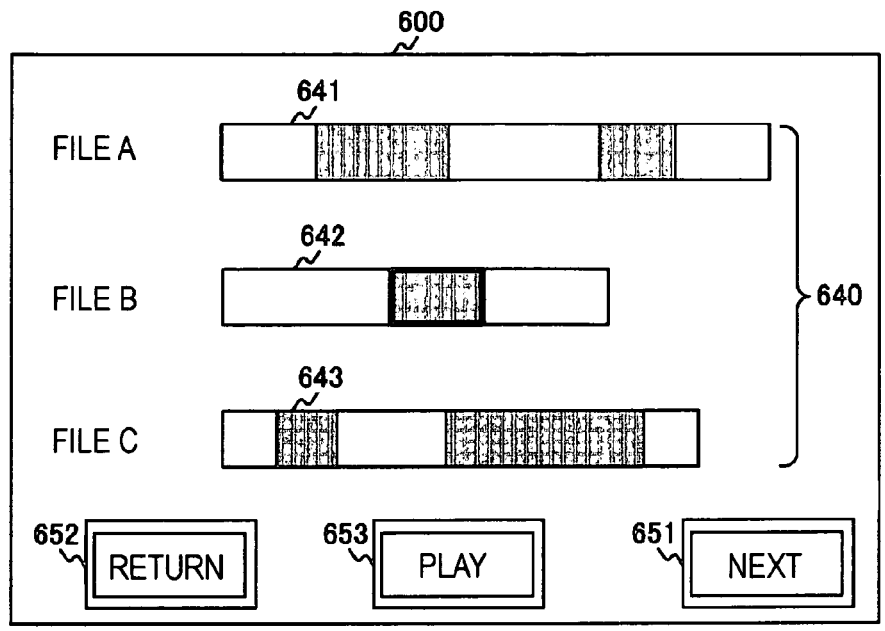
FIGS. 11A and 11B illustrate a scene time point display in accordance with one embodiment of the present invention.
Figure 11B:
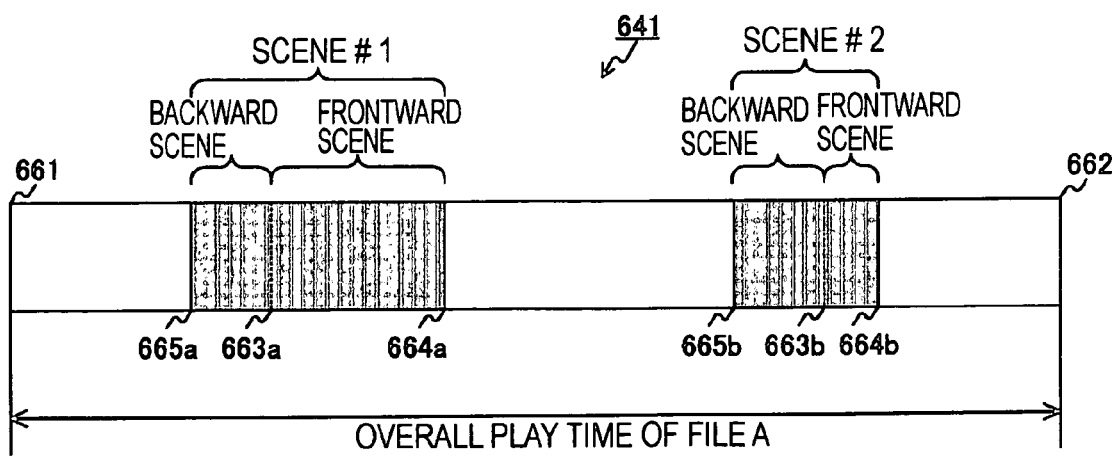

FIGS. 11A and 11B illustrate the scene time point display in accordance with one embodiment of the present invention. FIG. 11A illustrates a scene time point display group 640 displayed on the display screen 600. When the OK button 626 is selected after the selection of the area as shown in FIG. 4B, the scene detection process and the like are performed. As shown in FIG. 11A, the display screen 600 shows the scene time point display group 640.

As shown in FIG. 11A, scene time point displays 641 through 643 corresponding to three moving image files are displayed. The scene detection process is performed on all the moving image files stored on the moving image file storage unit 231. The number of scene time point displays equals the number of moving image files. As shown in FIG. 11A, the scene time point display 641 corresponding to a file A, the scene time point display 642 corresponding to a file B, and the scene time point display 643 corresponding to a file C are shown as the scene time point display group 640.

To display a scene time point display of another moving image file, a "next" button 651 or a "return" button 652 may be selected. For example, a scene time point display corresponding to a file D (not shown) may be displayed on the display screen 600. When any portion of a color display of the scene time point display group 640 is selected followed by the selection of a "play" button 653, a moving image corresponding to the scene is played.

FIG. 11B illustrates the scene time point display 641 corresponding to the file A displayed on the scene time point display group 640. Time from a start point 661 to an end point 662 in the scene time point display 641 is an overall play time of the file A.

Two scenes are detected in the file A. Here, 663*a* in scene #1 represents a time point of a frame found as a similar template image containing frame from among constructing frames constructing the moving image file, 664*a* in scene #1 represents a time point of the end frame of scene #1, and 665*a* represents a time point of the start frame of scene #1. The backward scene represented by the length from 665*a* to 663*a* and the frontward scene represented by the length from 663*a* to 664*a* construct scene #1.

The same is true of scene #2. Here 663*b* in scene #2 represents a time point of a frame found as a similar template image containing frame from among constructing frames constructing the moving image file, 664*b* in scene #2 represents a time point of the end frame of scene #2, and 665*b* represents a time point of the start frame of scene #2. The backward scene represented by the length from 665*b* to 663*b* and the frontward scene represented by the length from 663*b* to 664*b* construct scene #2.

FIGS. 12A-12D illustrate linking of scenes in accordance with one embodiment of the present invention. As shown in FIG. 12A, an end frame number of scene #1 and a start frame number of #2 are consecutively sequenced in the scene information table 320. A scene time point display generated based on the scene information table 320 is a scene time point display 670 of FIG. 12B.

In the scene time point display 670, the start frame position of scene #1 is time point 673, and the end frame position of scene #1 is time point 674. The start frame position of scene #2 is time point 674 and the end frame position of #2 is time point 675. When two scenes are consecutive, it is highly likely that one scene has been split into two scenes for a variety of reasons. If two scenes are consecutive, the two scenes are preferably handled as one scene.

In accordance with one embodiment of the present invention, if two scenes are consecutive, the two scenes are handled as one scene. When the scene information table 320 is available as shown in FIG. 12A, the scene time point display generator 321 rewrites the scene information table 320 to the one shown in FIG. 12C. More specifically, the end number frame of scene #1 is rewritten to the end number frame of #2, and the previous scene #2 is deleted. The scene time point display generated based on the scene information table 320 will display one scene only.

If two scenes remain consecutive without rewriting the content of the scene information table 320 as shown in FIG. 12C, the scene time point display generator 321 may generate a scene time point display of FIG. 12D as one scene.

Operation of the image pickup apparatus 100 of one embodiment of the present invention is described with reference to the drawings.

Figure 13:
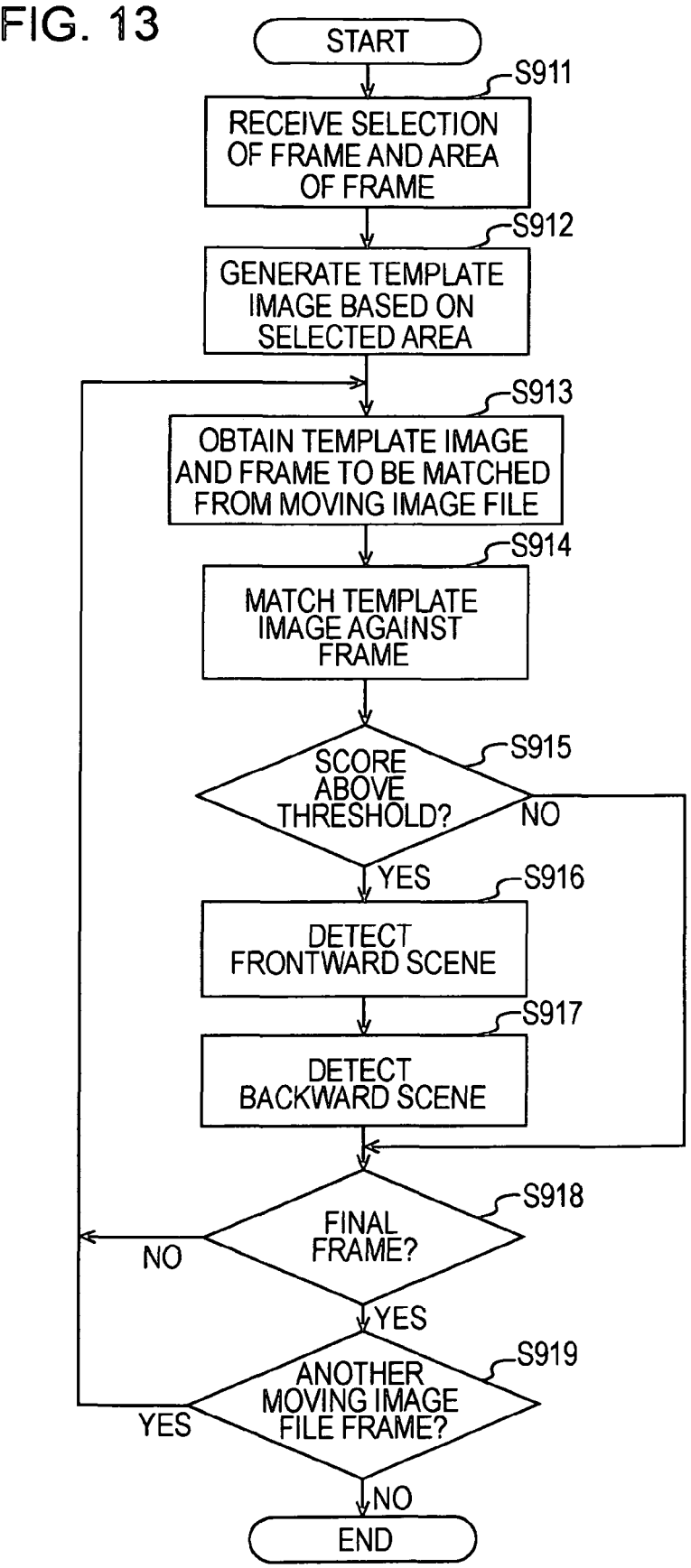
FIG. 13 illustrates a scene detection process in accordance with one embodiment of the present invention.

FIG. 13 is a flowchart illustrating the scene detection in accordance with one embodiment of the present invention. After the selection of a desired frame is received from the moving image file, the selection of the area of that frame is received (step S911). The template image generator 312 generates a template image based on the area selected in step S911 (step S912). More specifically, the template image is generated by extracting the area selected by the template image generator 312 from the frame. The images obtained by expanding or reducing the extracted image are also used as the template image.

The image matching unit 313 obtains, from the moving image file stored on the moving image file storage unit 231, the frame to be matched against the template image (step S913). In accordance with one embodiment of the present invention, the frames to be obtained and matched against the template image are of two types. One type is a frame coming subsequent to an end frame of a scene. The frame is obtained when the scene is detected. The other type is a frame that is located subsequent to a frame that has been just matched. That frame is obtained when the image matching unit 313 has failed to find a similar template image containing frame. The image matching unit 313 matches the frame obtained in step S913 against the template image (step S914).

After a matching process in step S914, the image matching unit 313 determines whether the degree of similarity (score) of any image in the frame to the template image is above a predetermined threshold value (step S915). If it is determined in step S915 that the degree of similarity (score) of any image in the frame to the template image is above the predetermined threshold value, the scene change detector 314 obtains a frame located prior to that frame in time sequence, and thus detects the frame with which the scene starts (step S916).

The scene change detector 314 obtains frames located subsequent to that frame and detects a frame with which the scene ends (step S917). The start and the end of the scene have been detected through the process in steps S916 and S917. The order of steps S916 and S917 is not important, and any of steps S916 and S917 can be performed prior to the other.

It is determined whether the end frame of the scene detected in step S916 corresponds to the final frame of the moving image file (step S918). It is determined that the end frame of the scene detected in step S918 does not correspond to the final frame of the moving image file, a frame subsequent to the final frame of the scene is obtained in step S913 and then step S914 and subsequent steps are repeated.

If the end frame of the scene is determined to be the final frame of the moving image file, it is determined whether the moving image file storage unit 231 stores a moving image file that has not undergone the process in steps S913 through S917 (step S919). If it is determined in step S919 that the moving image file storage unit 231 stores a moving image file that has not undergone the process in steps S913 through S917, processing returns to step S913. If it is determined in step S919 that the moving image file storage unit 231 stores no moving image file that has not undergone the process in steps S913 through S917, the scene detection process ends.

If the image matching unit 313 determines in step S915 that the degree of similarity (score) of any image in the frame to the template image is not above the predetermined threshold value, the frame is not treated as a similar template image containing frame, and the scene detection process in steps S916 through S917 is not performed. In this case, it is determined whether the frame matched in step S914 is the final frame of the moving image file (step S918).

If it is determined in step S918 that the frame matched in step S914 is not the final frame of the moving image file, processing returns to step S913. A frame subsequent to that frame is obtained and step S914 and subsequent steps are performed. If it is determined in step S918 that the frame matched in step S914 is the final frame of the moving image file, it is determined in step S919 whether the moving image file storage unit 231 stores a moving image file that has not undergone the process in steps S913 through S917. The process in step S919 is previously discussed.

In accordance with embodiments of the present invention, the template image is generated by selecting an object contained in any frame constructing the moving file using the area selection receiver 601. The scene change detector 314 detects one scene containing the object contained in the template image based on the distribution of the pixel values of the pixels of the frame. The scene is detected based on the distribution of the pixel values of the pixels of the frame. The scene detection is thus performed based on the human vision, and one scene containing the object of interest to a user is detected in the moving image. Since the frame reducer 311 reduces in size the frames for use in detection, the amount of calculation of the image matching unit 313 that searches the frame containing the image similar to the template image and the amount of calculation of the scene change detector 314 that performs the scene change detection process are reduced. High-speed scene detection becomes possible.

The image pickup apparatus has been discussed as an example of the image processing apparatus in accordance with embodiments of the present invention. The present invention is applicable to other type of electronic apparatuses that process images.

The embodiments of the present invention have been discussed for exemplary purposes only. As will be discussed below, the elements in each embodiment correspond to the elements in each claim. The present invention is not limited to the correspondence discussed below, and various changes are possible in the correspondence without departing from the scope of the present invention.

In accordance with one embodiment of the present invention, for example, the moving image file storage unit may correspond to the moving image file storage unit 231, the area selection receiving unit may correspond to the area selection receiver 601, the template image generating unit may correspond to the template image generator 312, the image matching unit may correspond to the image matching unit 313, and the scene change detecting unit may correspond to the scene change detector 314.

In accordance with one embodiment of the present invention, for example, the frame acquisition unit may correspond to the frame acquisition unit 315, the pixel value distribution generating unit may correspond to the pixel value distribution generator 316, the distribution difference sum calculating unit may correspond to the distribution difference adder 317, and the scene change determining unit may correspond to the scene change determiner 318.

In accordance with one embodiment of the present invention, for example, the frame reducing unit may correspond to the frame reducer 311.

In accordance with one embodiment of the present invention, for example, the moving image file information acquisition unit may correspond to the moving image information acquisition unit 319, the scene information table may correspond to the scene information table 320, and the scene time point display generating unit may correspond to the scene time point display generator 321.

In accordance with one embodiment of the present invention, for example, the image pickup unit may correspond to the image pickup section 10, the moving image file storage unit may correspond to the moving image file storage unit 231, the area selection receiving unit may correspond to the area selection receiver 601, the template image generating unit may correspond to the template image generator 312, and the image matching unit may correspond to the image matching unit 313. Furthermore, the scene change detecting unit may correspond to the scene change detector 314, the moving image file information acquisition unit may correspond to the moving image information acquisition unit 319, the scene information table may correspond to the scene information table 320, the scene time point display generating unit may correspond to the scene time point display generator 321, and the display unit may correspond to the display 61.

In accordance with embodiments of the present invention, for example, the moving image file storage unit may correspond to the moving image file storage unit 231. The step of receiving the selection of the predetermined area may correspond to step S911, the step of generating the template image may correspond to step S912, the step of matching the frame against the template image may correspond to steps S913 through S915, and the step of detecting the scene change may correspond to steps S916 and S917.

The process discussed with reference to the embodiments of the present invention may be considered as a method containing a series of steps. The process may be also considered as a program for causing a computer to perform the series of steps. The program may be stored on a recording medium.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus, comprising:
moving image file storage means for storing a moving image file;
area selection receiving means for receiving a selection of a predetermined area corresponding to one of a plurality of frames forming the moving image file;
template image generating means for generating as a template image an image of the selected area;
image matching means for obtaining the frames from the moving image file storage means, and for matching each of the frames against the template image to search for a matching frame containing an image similar to the template image; and
scene change detecting means for detecting a start and an end of a particular scene containing the matching frame when the matching frame is matched, wherein the scene change detecting means analyzes a difference sum between at least one pair of the frames located prior to the matching frame in time to detect the start of the particular scene and analyzes a difference sum between at least one pair of the frames located subsequent to the matching frame in time to detect the end of the particular scene.

2. The image processing apparatus according to claim 1, wherein the image matching means obtains from the moving image file storage means one frame every predetermined number of frames out of the plurality of frames positioned in time sequence.

3. The image processing apparatus according to claim 1, wherein the scene change detecting means comprises:
  frame acquisition means for obtaining, from the moving image file storage means, frames positioned in time sequence prior to and subsequent to the matching frame;
  pixel value distribution generating means for generating a distribution of pixel values for pixels forming the frames obtained by the frame acquisition means;
  distribution difference sum calculating means for calculating a distribution difference sum that is the sum of differences in distributions of the pixel values between frames adjacent to each other in time sequence;
  scene change determining means for determining whether the distribution difference sum is above a predetermined threshold, and if the distribution difference sum is above the predetermined threshold, for determining that the scene has changed, and for determining that a frame corresponding to the distribution difference sum above the predetermined threshold is one of a start frame or an end frame of the scene.

4. The image processing apparatus according to claim 3, wherein the frame acquisition means obtains, from the moving image file storage means, one frame every predetermined number of frames out of the plurality of frames positioned in time sequence prior to and subsequent to the matching frame.

5. The image processing apparatus according to claim 3, wherein
  the pixel value distribution generating means uses, as a pixel value, a quantity represented by YUV, and generates a distribution of each component of YUV for each pixel forming the frames obtained by the frame acquisition means,
  the distribution difference sum calculating means calculates, as the distribution difference sum, each of a Y component distribution difference sum, a U component distribution difference sum, and a V component distribution difference sum, by summing the differences in distributions of each component of the YUV between frames adjacent to each other in time sequence, and
  the scene change determining means determines whether each of the Y component distribution difference sum, the U component distribution difference sum, and the V component distribution difference sum is above a predetermined threshold value thereof, and if one of the Y component distribution difference sum, the U component distribution difference sum, and the V component distribution difference sum is above the predetermined threshold value thereof, the scene change determining means determines that the scene has changed, and that a frame corresponding to the one of the Y component distribution difference sum, the U component distribution difference sum, and the V component distribution difference sum above the predetermined threshold value thereof is one of a start frame or an end frame of the scene.

6. The image processing apparatus according to claim 1, further comprising frame reducing means for reducing frames forming the moving image file, wherein
  the moving image file storage means stores the frames that have been reduced by the frame reducing means,
  the area selection receiving means receives the predetermined area corresponding to one of the reduced frames,
  the image matching means matches each of the reduced frames against the template image to search for a matching reduced frame containing an image similar to the template image, and
  the scene change detecting means uses the matching reduced frame to detect a start and an end of a scene containing the matching reduced frame.

7. The image processing apparatus according to claim 6, wherein the frame reducing means reduces one frame every predetermined number of frames out of the plurality of frames positioned in time sequence.

8. The image processing apparatus according to claim 1, further comprising:
  moving image file information acquisition means for obtaining, from the stored moving image file, moving image file information including information relating to a start and an end of a moving image corresponding to the moving image file;
  a scene information table for storing the moving image file information and information relating to the start and the end of the particular scene containing the matching frame, with each moving image file associated with moving image file information and information relating to the start and the end of a particular scene; and
  scene time point display generating means for generating a scene time point display indicating a time of the particular scene with respect to the overall play time of the moving image based on the information relating to the start and the end of the moving image corresponding to the moving image file, and the information relating to the start and the end of the particular scene.

9. The image processing apparatus according to claim 8, wherein
  the moving image file information acquisition means obtains the number of frames contained in the moving image file as the information relating to the start and the end of the moving image corresponding to the moving image file,
  the scene information table contains a start frame number and an end frame number of the particular scene as the information relating to the start and the end of the particular scene containing the matching frame, and
  the scene time point display generating means generates the scene time point display based on the number of frames contained in the moving image file, and the start frame number and the end frame number of the particular scene.

10. The image processing apparatus according to claim 8, wherein the scene time point display generating means generates the scene time point display with one scene and the next scene subsequent to the one scene handled as a single scene if the end of the one scene is continued to the start of the next scene.

11. A processing method of an image processing apparatus including moving image file storage means storing a moving image file, the processing method comprising:

receiving a selection of a predetermined area corresponding to one of a plurality of frames forming the moving image file;

generating as a template image an image of the selected area;

obtaining the frames from the moving image file storage means, and matching each of the frames against the template image to search for a matching frame containing an image similar to the template image; and detecting a start and an end of a scene containing the matching frame when the matching frame is matched, the detecting including analyzing a difference sum between at least one pair of the frames located prior to the matching frame in time to detect the start of the scene and analyzing a difference sum between at least one pair of the frames located subsequent to the matching frame in time to detect the end of the scene.

12. A non-transitory recording medium recorded with a program for causing an image processing apparatus to execute an image processing method, the image processing apparatus including moving image file storage means storing a moving image file, the method comprising:

receiving a selection of a predetermined area corresponding to one of a plurality of frames forming the moving image file;

generating as a template image an image of the selected area;

obtaining the frames from the moving image file storage means, and matching each of the frames against the template image to search for a matching frame containing an image similar to the template image; and detecting a start and an end of a scene containing the matching frame when the matching frame is matched, the detecting including analyzing a difference sum between at least one pair of the frames located prior to the matching frame in time to detect the start of the scene and analyzing a difference sum between at least one pair of the frames located subsequent to the matching frame in time to detect the end of the scene.

13. An image processing apparatus, comprising:

a moving image file storage unit operable to store a moving image file;

an area selection receiving unit operable to receive a selection of a predetermined area corresponding to one of a plurality of frames forming the moving image file;

a template image generating unit operable to generate as a template image an image of the selected area;

an image matching unit operable to obtain the frames from the moving image file storage unit, and to match each of the frames against the template image to search for a matching frame containing an image similar to the template image; and a scene change detecting unit operable to detect a start and an end of a scene containing the matching frame when the matching frame is matched, wherein the scene change detecting unit analyzes a difference sum between at least one pair of the frames located prior to the matching frame in time to detect the start of the scene and analyzes a difference sum between at least one pair of the frames located subsequent to the matching frame in time to detect the end of the scene.

* * * * *